United States Patent [19]

Tumminelli et al.

[11] Patent Number: 5,121,460

[45] Date of Patent: Jun. 9, 1992

[54] HIGH-POWER MODE-SELECTIVE OPTICAL FIBER LASER

[75] Inventors: Richard P. Tumminelli, Ashland; Farhad Hakimi, Watertown, both of Mass.

[73] Assignee: The Charles Stark Draper Lab., Inc., Cambridge, Mass.

[21] Appl. No.: 648,726

[22] Filed: Jan. 31, 1991

[51] Int. Cl.$^5$ ............................................... G02B 6/22
[52] U.S. Cl. ........................................ 385/126; 372/6; 385/15; 385/141
[58] Field of Search ............... 350/96.15, 96.34, 96.33, 350/96.29; 372/6; 385/15, 126, 141

[56] References Cited

U.S. PATENT DOCUMENTS

| | | | |
|---|---|---|---|
| 4,815,079 | 3/1989 | Snitzer et al. | 350/96.33 |
| 4,818,047 | 4/1989 | Takuma et al. | 350/96.33 |
| 4,877,306 | 10/1989 | Kar | 350/96.33 |
| 4,896,942 | 1/1990 | Onstott et al. | 350/96.33 |
| 4,923,279 | 5/1990 | Ainslie et al. | 350/96.33 |

Primary Examiner—Georgia Y. Epps
Attorney, Agent, or Firm—Iandiorio & Dingman

[57] ABSTRACT

An optical fiber includes a multimode primary core having an index or refraction $N_1$ and doped with a material providing optical gain; the cladding surrounding the core having an index of refraction $N_2$; and a secondary core doped with an absorbent material for providing optical loss in unwanted modes.

20 Claims, 5 Drawing Sheets

HIGH-POWER MODE-SELECTIVE OPTICAL FIBER LASER

FIELD OF THE INVENTION

This invention features an improved optical fiber which can be used in a fiber optic amplifier or laser, and more particularly to such an optical fiber which employs a secondary core to absorb undesirable modes and increase power level capability in desired modes.

BACKGROUND OF INVENTION

Semiconductor diode lasers such as phased array diode lasers are a preferred source of radiation for pumping fiber lasers because of their high power efficiency and availability at useful wavelengths. However, the output of such diode lasers is multimode and non-circular in cross section. Multimode beams are generally undesirable and non-circular cross-section make it difficult to match the pump output to the fiber laser input. This problem has been addressed by using a double clad fiber laser in which the single-mode core waveguide is surrounded by a second waveguide which accepts the multimode radiation and uses that multimode radiation to pump the single-mode core to produce the fiber laser action in that single-mode core. This technique is taught in U.S. Pat. No. 4,815,079 issued Mar. 21, 1989.

This solved two problems: first, the greater available power of the laser diodes in undesirable multimode form could be used to efficiently pump a single-mode fiber to obtain the desired single-mode laser output. Further, the increased area of the second multimode waveguide relative to the area of the first single-mode waveguide also extended by approximately the same ratio the length of the single-mode fiber over which absorption occurs. This distributed absorption similarly distributes the heat over a longer length, thereby increasing the acceptable pump and output power levels. Without such broader distribution of the heat the temperature could rise to elvels which would impede the laser action.

However, there are still power limiting constraints on the double clad fiber laser. First, there is a limit on how much laser power the single-mode waveguide can sustain before optical damage occurs to the core. To prevent this the power density in the core must be decreased. Both this can only be accomplished by increasing the cross-section area of the core and large cores will support undesirable high order modes. Second, the present developments in semiconductor lasers, such as phrased array diode lasers, are tending toward ever larger apertures inconjunction with increasing laser power. This requires that the second, multimode waveguide be made larger to match the aperture of those lasers. But when the ratio of the area of multimode waveguide to the area of the single-mode waveguide increases, the absorption per unit length decreases proportionally. Therefore the length of the fiber laser has to be increased to absorb the additional power. The longer fiber length constitutes a loner laser cavity which introduces more loss and can reduce the efficiency of the laser action or defeat the laser action entirely.

thus the problem devolves to making the single-mode fiber optical laser long enough to safely absorb all the required power and short enough to avoid laser cavity losses that would suppress or defeat laser action. Presently, increasing power absorption in the single-mode fiber while minimizing lengthening of the fiber can be accomplished by increasing the diameter of the fiber, but this permits greater multimode propagation, which is undesirable.

SUMMARY OF THE INVENTION

It is therefore an object of this invention to provide an improved optical fiber for sue as an amplifier or laser which maintains single-mode propagation at increased core diameter, enabling operation at whither power and efficiency.

It is a further object of this invention to provide such an improved optical fiber which operates at high power in single mode.

it is a further object of this invention to provide such an improved optical fiber which enables high power operation with optimum core length to minimize cavity loss and maximize heat distribution in the core in double-calls applications.

The invention results from the realization that an improved fiber optic element for use in an amplifier or a laser with increased power capacity and high efficiency can be achieved by using a secondary core which differentially absorbs the undesirable mode(s) either in the primary core or around it, and further that the differential absorption can be enhanced when the secondary core surrounds the primary core, by utilizing an index of refraction in the secondary core which increases penetration of the undesirable mode(s) into the surrounding cladding.

This invention features an optical fiber including a multimode primary core having an index of refraction $N_1$ and doped with a material providing optical gain; a cladding surrounding the core having an index of refraction $N_2$; and a secondary core doped with an absorbent material for providing optical loss in unwanted modes.

In a preferred embodiment the secondary core is disposed in the cladding surrounding the primary core and suppressing higher order modes and the secondary core may be spaced from the primary core. Alternatively, the secondary core may be disposed in the primary core for suppressing the fundamental mode.

The secondary core may have an index of refraction $N_3 > N_2$ for differentially increasing the penetration of higher order modes into the cladding relative to the fundamental mode. The primary core may be neodymium doped and the secondary core may be samarium doped, and the index of refraction $N_1$ may be greater than index of refraction $N_2$. The fiber optic element may form a part of the fiber optic amplifier or laser. The optical fiber may be constructed with a second cladding surrounding the first cladding. The second cladding may have an index of refraction $N_4$ which is less than the index of refraction $N_2$.

DISCLOSURE OF PREFERRED EMBODIMENT

Other objects, features and advantages will occur to those skilled in the art from the following description of a preferred embodiment and the accompanying drawings, in which.

Figure 1:
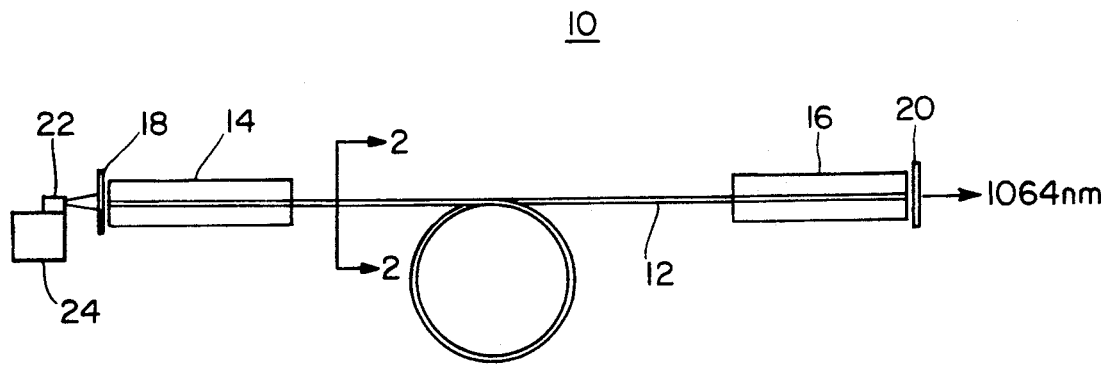
FIG. 1 is a schematic diagram of a fiber optic laser using a fiber optic element according to this invention.
Figure 2:
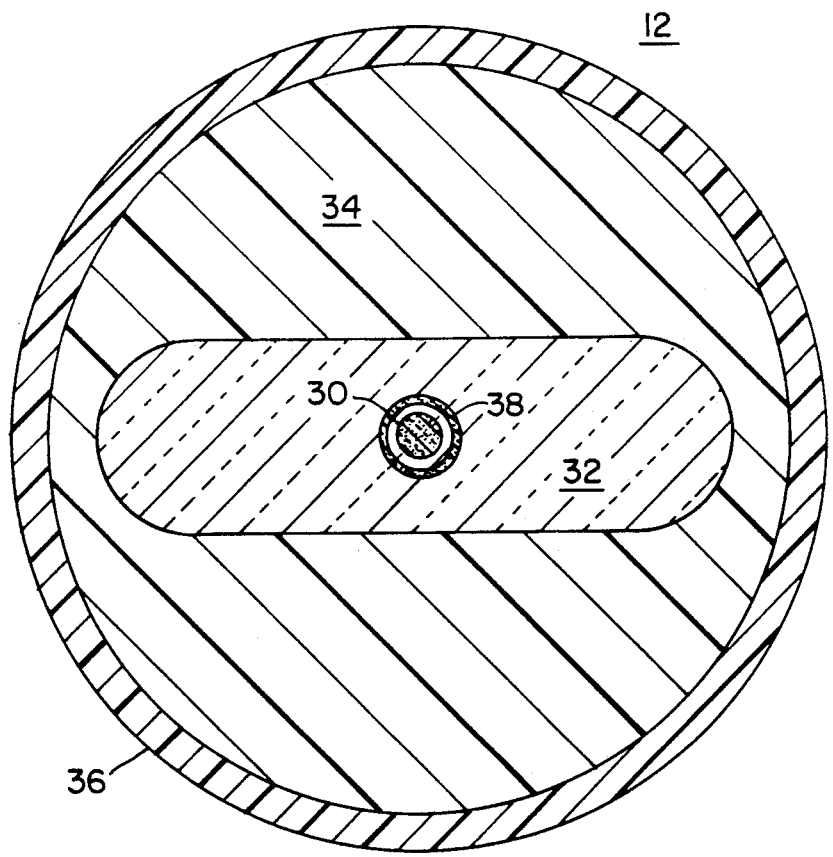
FIG. 2 is a cross-sectional view taken along lines 2—2 of FIG. 1, of the high-power flat double-clad fiber optic element used in the laser of FIG. 1.

There is shown in FIG. 1 a fiber optic laser 10 which uses a flat, double-clad fiber optic element 12 according to this invention. Fiber optic element 12 includes a mounting capillary 14, 16, and a mirror 18, 20 at each end. A phased array semiconductor laser diode 22 on mounting block 24 provides pumping radiation at 807 nm. Input mirror 18 is 100% transmissive at 807 nm and 100% reflective at 1064 nm. Exit mirror 20 is 100% reflective at 807 nm but only 90% reflective at 1064 nm, so that the emitted laser light occurs at 1064 nm. Although fiber optic element 12 according to this invention is shown as a part of fiber optic laser 10, FIG. 1, it may also be used in fiber optic amplifiers. The device shown in FIG. 1 may be easily converted to a fiber optic amplifier by simply removing mirrors 18 and 20.

Fiber optic element 12 produces a primary core 30 which is neodymium doped and has a radius of 5 microns. Primary core 30 has an index of refraction $N_1$ of 1.4635. Surrounding primary core 30 is a flat or elliptically shaped first multimode cladding 32 of fused silica, which has an index of refraction $N_2$ of 1.4585. Surrounding first cladding 32 is second cladding 34 made of a soft low-index polymer having an index of refraction $N_4$ of 1.39. Second cladding 34 is surrounded by a hard polymer coating 36. Surrounding and spaced from primary core 30 and disposed in first cladding 32 is secondary core 38, which is a samarium doped ring of from 7 to 8 micron radius. It has an index of refraction $N_3$ of 1.4615. It can be seen from the values of the indices of refraction that $N_1 > N_3 > N_2 > N_4$. Samarium doped ring 38 absorbs well in the 1064 nm region. While samarium is used to dope the secondary core to absorb 1064 nm radiation, other materials such as rare earths and transition metals may be used to dope the secondary core for absorbing other wavelengths.

Figure 3:
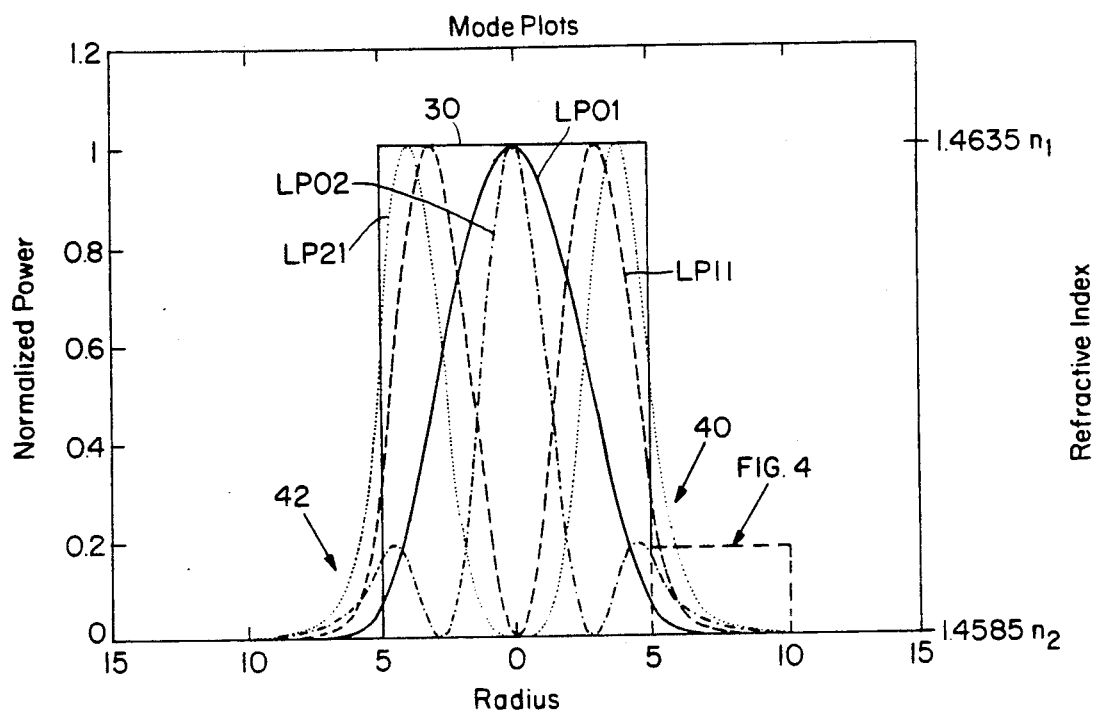
FIG. 3 is a plot of the power distribution of the fundamental mode and three higher order modes with respect to the radius of the primary core and first cladding.
Figure 4:
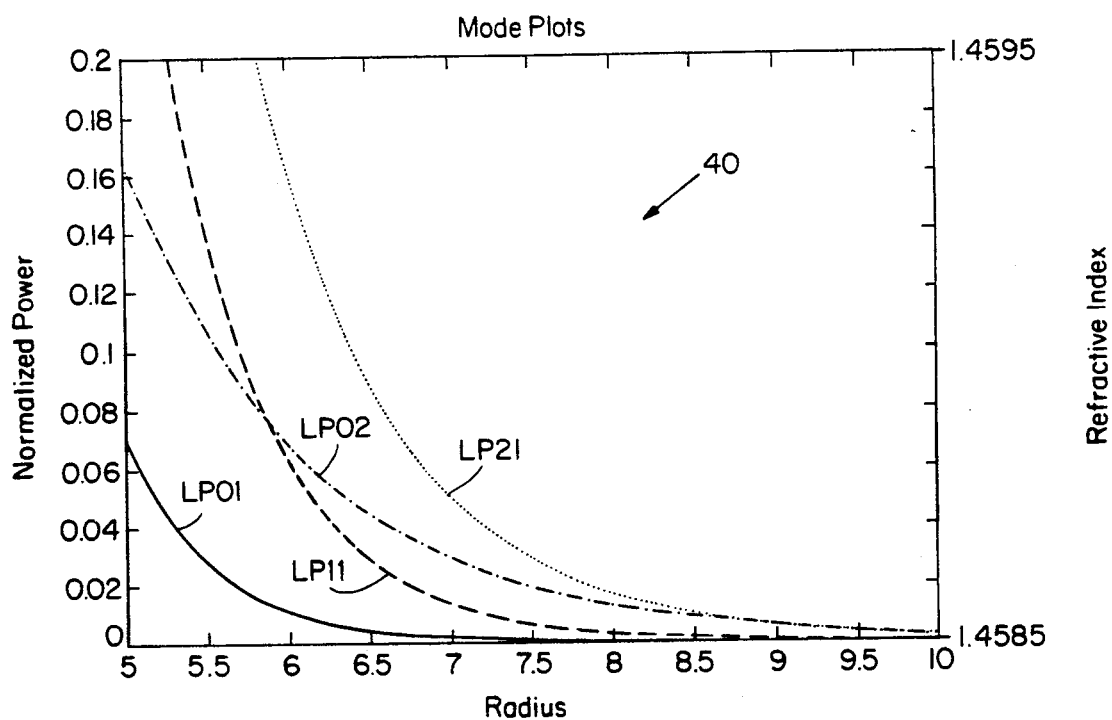
FIG. 4 is a enlarged view of the portion of FIG. 3 indicated in dashed lines.

Step index profile, FIG. 3, shows the power distribution of the fundamental mode $LP_{01}$ and three higher order modes, $LP_{02}$, $LP_{11}$ and $LP_{21}$, in the boundaries of primary core 30 as well as just outside primary core 30 in cladding 32 as indicated in regions 40 and 42. The lower portion of region 40, bounded by dashed lines, is shown enlarged in greater detail in FIG. 4, where it is apparent that there is a significant distinction in the power distribution of the three higher order modes $LP_{02}$, $LP_{11}$ and $LP_{21}$, as compared to that of the fundamental mode $LP_{01}$.

Figure 5:
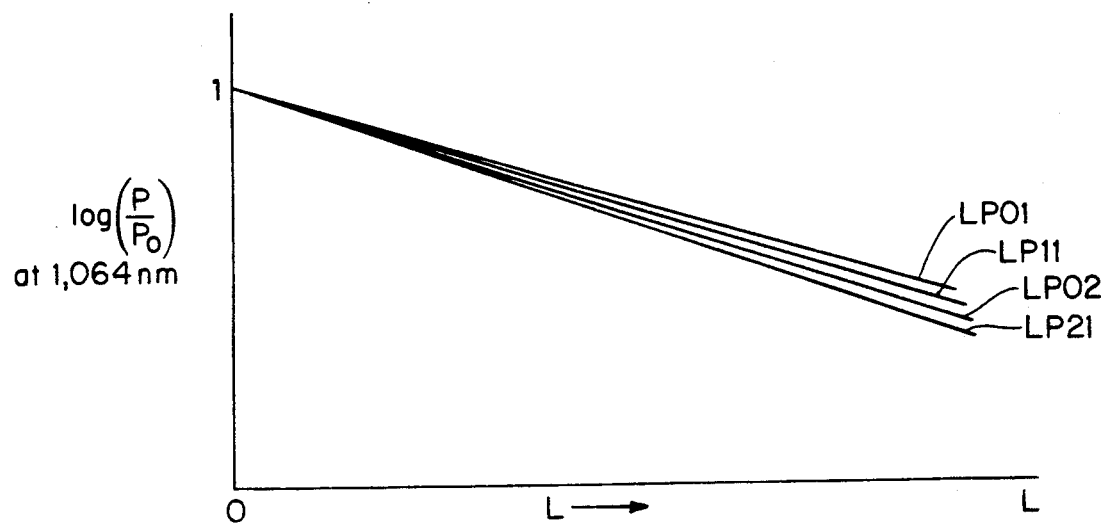
FIG. 5 is an illustration of the modal attenuation as a function of length for the fundamental and three higher order modes of FIGS. 3 and 4 when there is no secondary core absorber present.
Figure 6:
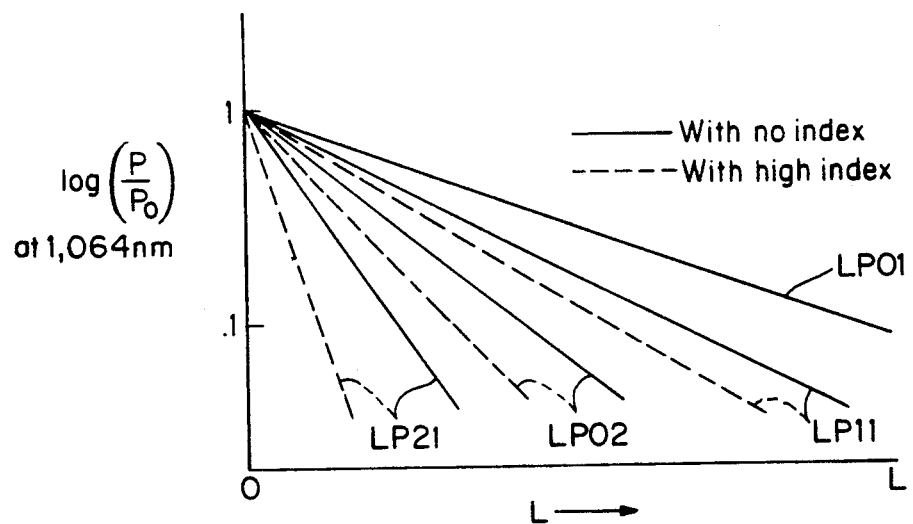
FIG. 6 is an illustration similar to FIG. 5 of the modal attenuation as a function of length when a secondary core absorber is present, indicated by the full line characteristics with an absorber.
Figure 7:
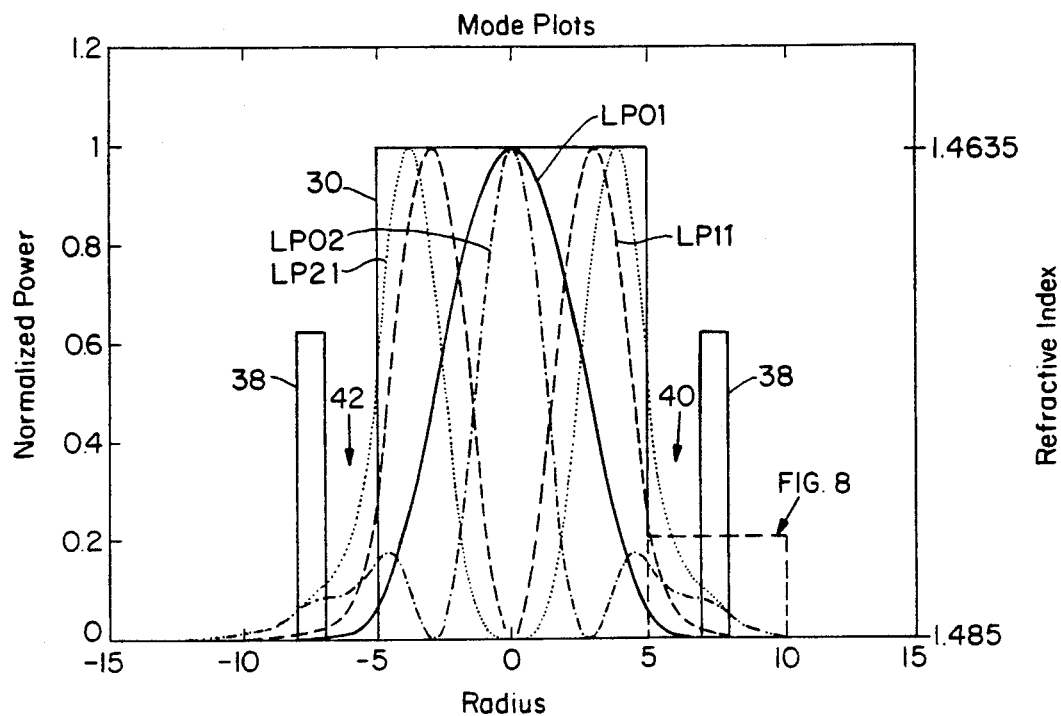
FIG. 7 is a plot of the power distribution of the fundamental mode and three higher order modes with respect to the radius of the primary core and first cladding, illustrating the effect of an enhancing index of refraction in the secondary core.
Figure 8:
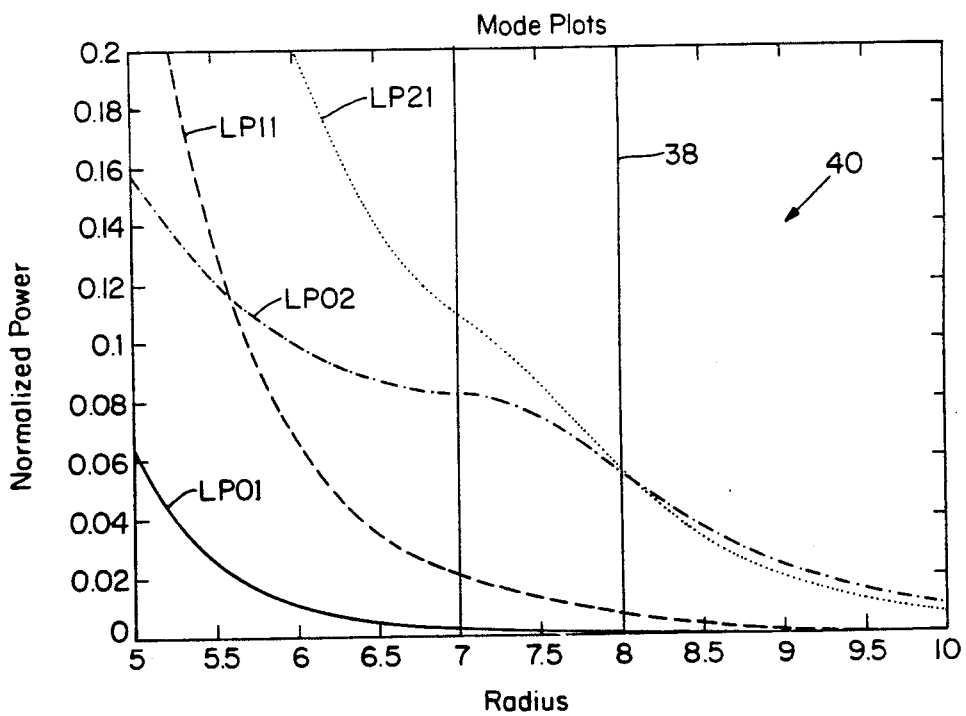
FIG. 8 is an enlarged detail view of the portion of FIG. 5 indicated in dashed lines.

Without the use of the secondary core absorber as taught by this invention, the modal attenuation of the four modes is shown in FIG. 5, where all four modes are quite closely aligned. In contrast, when the secondary core of an absorber according to this invention is used, a dramatic spreading of the modal attenuation characteristics occurs as indicated in FIG. 6. This effect can be further enhanced by employing a secondary core having an index of refraction which is more than that of the multimode cladding 32 but lower than that of the primary core 30. The differential between the fundamental mode and the higher order modes can be enhanced as shown in FIG. 7, where a distinct increase in the power under the higher order modes can be seen to occur in the region of the secondary core 38. This increase in the differential is shown more clearly in the enlarged detail view of region 40 provided in FIG. 8. For this increased differential, the absorber has an even greater opportunity to effect higher modal order attenuation so that the spreading becomes even more pronounced as indicated by the disposition of the attenuation characteristic in FIG. 6, shown in phantom, which represents the spreading of the mode when a higher index of refraction is provided in the secondary core 38.

Figure 9:
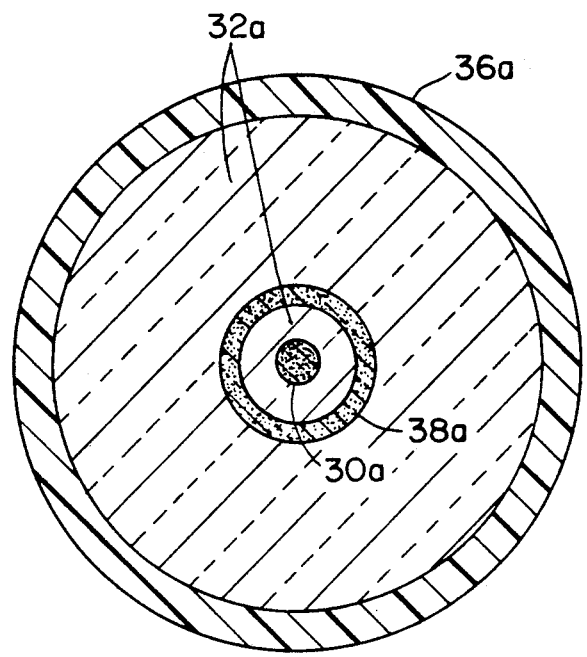
FIG. 9 is a cross-sectional view of a simpler construction of a fiber optic element according to this invention with only a single cladding.

Although thus far fiber optic element 12 according to this invention has been shown with double cladding, the first of which has a flat or elliptical cross-section, neither of these limitations is necessary for this invention. The first cladding may be any other shape including round and there need be no second cladding. As illustrated in FIG. 9, fiber optic element 12a may include a primary core 30a surrounded by a single cladding 32a in which is disposed a secondary core 38a surrounding and spaced from the primary core 30a. A protective coating 36a surrounds cladding 32a.

Figure 10:
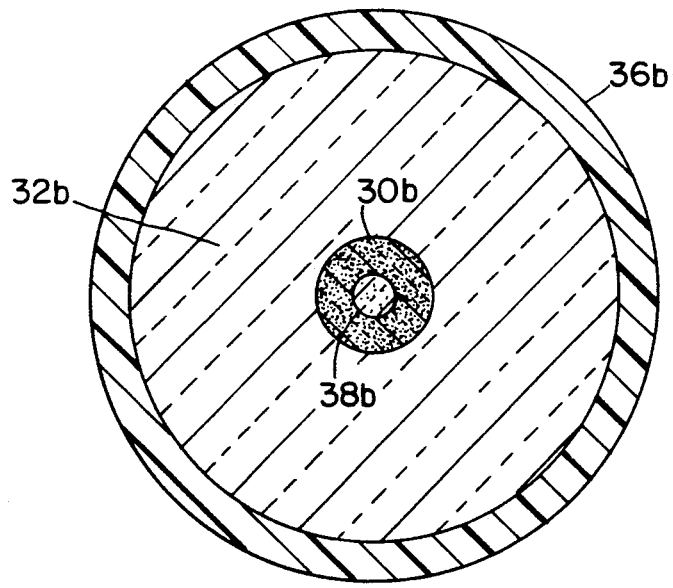
FIG. 10 is a cross-sectional view similar to FIG. 9 with the secondary core shown inside of the primary core.

Thus far the fiber optic elements depicted employ the secondary core according to this invention to strip away the higher order modes of the primary core, making it effectively a single mode carrier for the fundamental mode. This is not a necessary limitation of the invention. For example, it is often desirable to create a doughnut-shaped beam by suppressing the fundamental mode. This can be done according to this invention by placing the secondary core 38b, FIG. 10, inside of the primary core 30b. In that construction the fundamental is suppressed and the higher order modes are propagated. The fundamental mode becomes the undesirable mode and the higher order modes become the desirable modes.

Although specific features of the invention are shown in some drawings and not others, this is for convenience only as each feature may be combined with any or all of the other features in accordance with the invention.

Other embodiments will occur to those skilled in the art and are within the following claims:

What is claimed is:
1. An optical fiber comprising:
   a multimode primary core having an index of refraction $N_1$;
   a cladding surrounding said core and having an index of refraction $N_2$; and
   a secondary core of absorber material for absorbing radiation at unwanted modes.

2. The optical fiber of claim 1 in which said secondary core is disposed in said cladding surrounding said primary core for suppressing higher order modes.

3. The optical fiber of claim 2 in which said secondary core is spaced from said primary core.

4. The optical fiber of claim 1 in which said secondary core is disposed in said primary core for suppressing the fundamental mode.

5. The optical fiber of claim 2 in which said secondary core has an index of refraction $N_3 > N_2$ for differentially increasing the penetration of the higher order modes into said cladding relative to the fundamental mode.

6. The optical fiber of claim 1 in which said primary core is neodymium doped and said secondary core is samarium doped.

7. The optical fiber of claim 1 in which $N_1 > N_2$.

8. A fiber optic amplifier comprising:
a source of radiation; and
an optical fiber for amplifying radiation supplied to it by said source of radiation including
a multimode primary core having an index of refraction $N_1$,
a cladding surrounding said ore and having an index of refraction $N_2$, and
a secondary core of absorber material for absorbing radiation at unwanted modes.

9. A fiber optic laser comprising:
a source of pump radiation;
a resonant cavity including an optical fiber having
a multimode primary core having an index of refraction $N_1$,
a cladding surrounding said core and having an index of refraction $N_2$, and
a secondary core of absorber material for absorbing radiation at unwanted modes; and
means for extracting laser light from said optical fiber.

10. An optical fiber comprising:
a multimode primary core having an index of refraction $N_1$;
a first multimode cladding surrounding said core and having an index of refraction $N_2$;
a second cladding surrounding said first cladding; and
a secondary core of absorber material for absorbing radiation at unwanted modes.

11. The optical fiber of claim 10 in which said secondary core is disposed in said first multimode cladding surrounding said primary core for suppressing higher order modes.

12. The optical fiber of claim 11 in which said secondary core is spaced from said primary core.

13. The optical fiber of claim 10 in which said secondary core is disposed in said primary core for suppressing the fundamental mode.

14. The optical fiber of claim 11 in which said secondary core has an index of refraction $N_3 > N_2$ for differentially increasing the penetration of the higher order modes into said cladding relative to the fundamental mode.

15. The optical fiber of claim 10 in which said primary core is neodymium doped and said secondary core is samarium doped.

16. The optical fiber of claim 10 in which $N_1 > N_2$.

17. The optical fiber of claim 10 in which said second cladding has an index of refraction $N_4 < N_2$.

18. The optical fiber of claim 10 in which the cross-sectional area of said second cladding taken substantially transverse to the axial extent of the optical fiber has a first path across said area which passes substantially through the geometric center thereof whose length is substantially different from the length of a second path across said area which passes substantially through the geometric center thereof, said second path being substantially perpendicular to said first path.

19. A fiber amplifier comprising:
a source of radiation; and p1 an optical fiber for amplifying radiation supplied to it by said source of radiation including
a multimode primary core having an index of refraction $N_1$,
a first multimode cladding surrounding said core and having an index of refraction $N_2$,
a second cladding surrounding said first cladding, and
a secondary core of absorber material for absorbing radiation at unwanted modes.

20. A fiber optic laser comprising:
a source of pump radiation;
a resonant cavity including an optical fiber having
a multimode primary core having an index of refraction $N_2$,
a fist multimode cladding surrounding said core and having an index of refraction $N_2$,
a second cladding surrounding said first cladding, and
a secondary core of absorber material for absorbing radiation at unwanted modes; and
means for extracting laser light from said optical fiber.

* * * * *